UNITED STATES PATENT OFFICE.

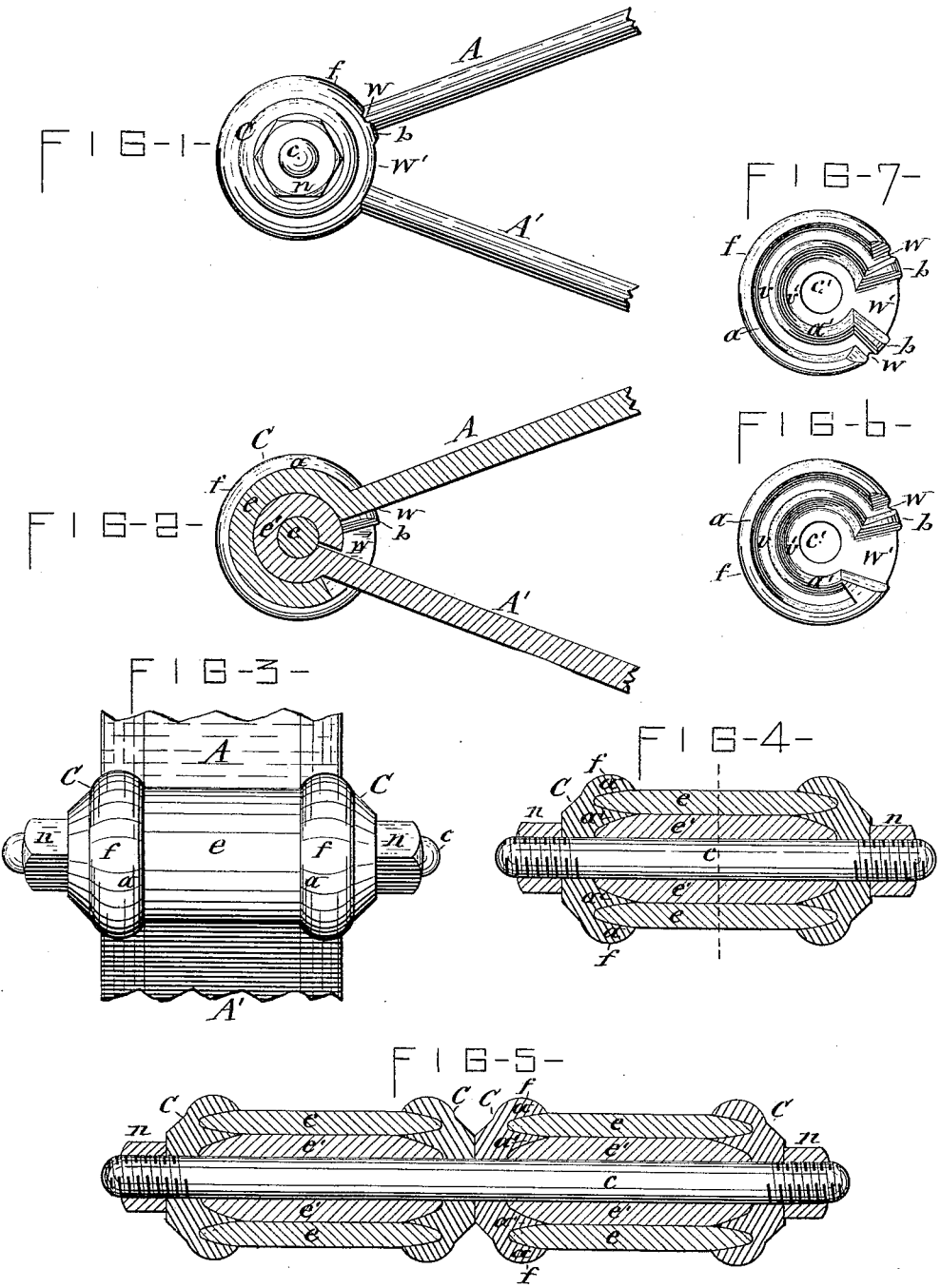

EDWARD CLIFF, OF OSWEGO, NEW YORK, ASSIGNOR TO THE CLIFF & RIGHTER COMPANY, (LIMITED,) OF SAME PLACE.

ELLIPTIC SPRING.

SPECIFICATION forming part of Letters Patent No. 326,847, dated September 22, 1885.

Application filed March 16, 1885. (No model.)

*To all whom it may concern:*

Be it known that I, EDWARD CLIFF, of Oswego, in the county of Oswego, in the State of New York, have invented new and useful Improvements in Elliptic Springs, of which the following, taken in connection with the accompanying drawings, is a full, clear, and exact description.

This invention relates to the couplings of the ends of the upper and lower halves of an elliptic spring, and has special reference to that class of couplings in which eyes formed on the ends of the spring are made so that one embraces the other, and the two eyes are confined between caps, which are clamped onto the ends of the eyes and have annular flanges embracing the same.

This invention consists in an improved and simplified construction and combination of the aforesaid parts, whereby the coupling is rendered more efficient and more durable, and the rattling thereof is effectually prevented.

In the accompanying drawings, Figure 1 is a side view of one end of an elliptic spring embodying my invention. Fig. 2 is a vertical longitudinal section taken on line *x x* in Fig. 4. Fig. 3 is an end view of the aforesaid portion of the spring. Figs. 4 and 5 are vertical transverse sections taken through the center of the coupling of the leaves, and showing my invention embodied in a single and in a double elliptic spring, respectively. Fig. 6 is an inner face view of one of the caps by means of which the leaves of the spring are coupled together, and Fig. 7 illustrates modifications of the construction of said caps.

Similar letters of reference indicate corresponding parts.

A A' represent, respectively, one of the end portions of the upper and lower main leaves of the spring. Said leaves are beveled on their side edges, and the ends thereof are maintained at uniform dimensions in cross-section and nearly or quite equal to that of the body of the leaf, so as to retain the same strength. These end portions of the two leaves are formed into nearly complete eyes *e e'*. The eye *e'* of one leaf is of a proper diameter to embrace the coupling-bolt *c*, which passes through it, and in order to form a substantial bearing between said parts I form the interior of the eye *e'* straight from end to end, as shown in Figs. 4 and 5 of the drawings. The other eye, *e*, is made of sufficiently greater diameter to embrace the eye *e'*, and by their being maintained of a uniform thickness of metal throughout, the joint between the eyes becomes concentric with the coupling-bolt *c*, thus maintaining the joints between the eyes and caps in uniform bearings during the vibrations of the spring. The eye *e* is connected with the eye *e'* by slipping the former laterally over the latter.

C C are two caps clamped onto the ends of the eyes *e e'* by the coupling-bolt *c*, which passes through holes *c'* in the center of said caps and through the inner or small eye, *e'*, and is provided on its ends with nuts *n n*, by which to tighten the caps on the eyes. Said caps are each provided with a segmental marginal flange, *a*, which embraces the beveled end of the outer eye, *e*, and is beveled correspondingly on its inner side, so that by tightening the nuts *n* on the coupling-bolts *c* the eye *e* becomes wedged within the flanges *a* of the two caps, thus effectually preventing the rattling of the coupling. Any wear that may occur between the eye *e* and the flanges *a* of the caps can be readily taken up by tightening the nuts *n*.

In order to re-enforce the flange *a*, and at the same time produce a neat and workmanlike finish, I terminate the edge of said flange at the beginning of the bevel of the end of the eye *e*, and form the exterior of said flange with a bead, *f*.

About midway between the flange *a* and the bolt-hole *c'*, I provide the inner sides of the cap C with a segmental flange or rib, *a'*, concentric with the flange *a* and bolt-hole, as shown in Figs. 6 and 7 of the drawings. This flange or rib is of a height nearly or quite equal to the width of the beveled end portions of the two eyes *e e'*, and beveled correspondingly both on the inner and outer sides, so as to act as a wedge entering between the aforesaid eyes, as illustrated in Figs. 4 and 5 of the drawings. Said rib *a'* also serves to re-enforce the cap.

Heretofore it has been customary to taper the end portion of the leaf of which the eye was formed. This not only weakens the coupling, but also renders the joint between the two eyes eccentric, and when the spring is compressed the resultant turning of the two eyes draws the tapered end portions thereof back toward each other, and thus leaves a space between the eyes and the outer flanges of the caps, which space allows the parts to rattle, which defect is obviated by making the joint between the eyes $e\ e'$ concentric with the flange $a$ and coupling-bolt $c$, as hereinbefore specified.

It will be observed that by providing the caps C C with the rib $a'$ midway between the flange $a$ and bolt-hole $c'$, I form in said caps two separate and distinct channels, $v\ v'$, in which the ends of the two eyes are respectively seated. Both of said channels are intersected by openings W W', extending through the outer edge of the caps, which are also separated from each other by lateral extensions $b\ b$ of the rib $a'$. These extensions of the rib $a'$ serve to compel the caps to turn with the eye of the upper half of the spring when the latter is subjected to vibration, thus obviating friction, abrasion, and wear between said parts, and also the resultant marring of the external finish of the caps, and inasmuch as the rib-extension $b$ is integral with the rib $a'$, said extension is thoroughly braced to prevent its breakage.

If desired, the channel $v$ may be terminated with two lateral openings, $w\ w$, as represented in Fig. 7 of the drawings, thereby rendering the cap reversible to allow it to be applied to either end of the spring-eyes $e\ e'$. The other opening, $w'$, is of sufficient width to allow the requisite play to the leaf A', passing through it.

I am aware that prior to my present invention the ends of the main leaves of elliptic springs have been formed into segmental bearings, each of which embraces only a small portion of the coupling-bolt, on which they were held by caps embracing both bearings; but it is obvious that such bearings do not afford the requisite secure hold either on the bolt or in the cap. By my improvement the spring ends are formed into nearly complete eyes of uniform thickness of metal throughout, the inner eye being made as small as possible, and to effectually embrace the bolt, while the other and larger eye nearly encompasses the smaller eye, and in no instance were the edges of the eyes and the overlapping flanges of the caps beveled to wedge the former in the latter.

Having described my invention, what I claim as new, and desire to secure by Letters Patent, is—

1. The caps C C, formed with the bolt-hole $c'$, segmental marginal flange $a$, and segmental rib $a'$, the latter being arranged between the bolt-hole and flange $a$, and terminating with outward extensions, $b\ b$, substantially as described and shown.

2. In combination with the eyes $e\ e'$, the caps C, formed with the bolt-hole $c'$, segmental marginal flange $a$, and segmental rib $a'$, midway between the hole $c'$ and flange $a$, substantially as shown.

3. In combination with the eyes $e\ e'$, the caps C, formed with the bolt-hole $c'$, segmental marginal flange $a$, beveled on its inner side, and the segmental rib $a'$, midway between the hole $c$ and flange $a$, and beveled on both sides, substantially as described and shown.

4. The caps C, formed with the bolt-hole $c'$, marginal flange $a$, and the rib $a'$ between the bolt-hole $c'$ and flange $a$, and beveled on its inner side, in combination with the eye $e'$, encompassing the coupling-bolt and beveled on its outer side, the eye $e$, encompassing the eye $e'$, and the coupling-bolt $c$ and nuts $n$, clamping the caps onto the ends of said eyes, substantially as described and shown.

5. In combination with the eye $e$, beveled on its edges, the caps C C, having the flanges $a$ embracing the beveled portions of said eye and terminating at the beginning of the bevels thereof, substantially as described and shown.

6. In combination with the eye $e$, beveled on its edges, and the caps C C, having the flanges $a\ a$, embracing the beveled portions of said eye and terminating at the beginning of the bevels, and formed with a bead, $f$, on their exterior, substantially as described and shown.

7. The improved spring-coupling, consisting of the small eye $e'$, formed on the end of one of the leaves, and of uniform thickness of metal, and embracing the coupling-bolt, the eye $e$ on the other leaf, also of uniform thickness of metal, embracing the eye $e'$, the caps C C, having marginal flanges $a\ a$, embracing the ends of the eye $e$, and the coupling-bolt $c$, passing through the caps and through the eye $e'$, all constructed and combined to form concentric joints between the two eyes and caps, substantially as described and shown.

8. The combination of the eyes $e\ e'$, formed on the ends of the spring, and beveled on their edges, and one embracing the other, the caps C C, having flanges $a\ a$, beveled on their inner side, embracing the beveled edges of the outer eye, $e$, and the coupling-bolt $c$, for drawing the caps onto the eyes, whereby the eyes become wedged in the caps, and thus rattling is prevented, substantially as described and shown.

9. The combination of the spring-leaves A A', formed with beveled edges and, respectively, with eyes $e\ e'$, of the same cross-sectional form throughout as the body of leaves, one of said eyes embracing the other, the caps C C, provided with marginal flanges $a$, embracing the ends of the outer eye, $e$, and beveled correspondingly, the coupling-bolt $c$, passing through the caps and through the eye $e'$, and the clamping-nuts $n$ on the ends of said bolt, for drawing the caps against the eyes and wedging the latter within the beveled flanges of the caps, substantially as described and shown.

In testimony whereof I have hereunto signed my name and affixed my seal, in the presence of two attesting witnesses, at Oswego, in the county of Oswego, in the State of New York, this 12th day of March, 1885.

EDWARD CLIFF. [L. S.]

Witnesses:
 Jos. McGowan,
 J. I. Weed.